R. GUNZBURG.
APPARATUS FOR USE IN PRACTISING THE GAME OF GOLF.
APPLICATION FILED SEPT. 18, 1915.
1,173,262.
Patented Feb. 29, 1916.
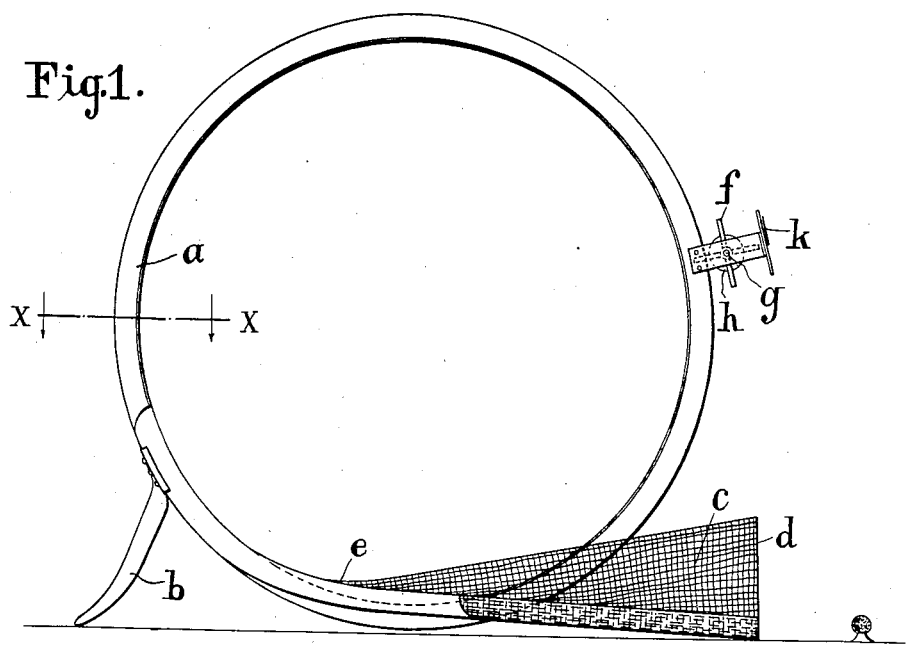
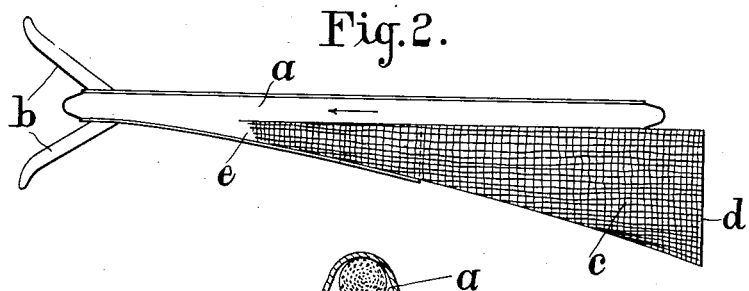
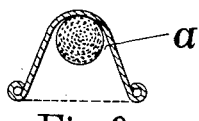
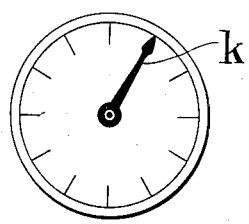
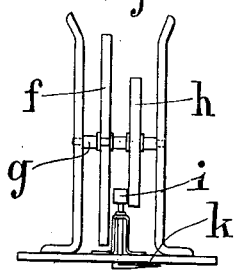

UNITED STATES PATENT OFFICE.

ROBERT GUNZBURG, OF KENSINGTON, ENGLAND.

APPARATUS FOR USE IN PRACTISING THE GAME OF GOLF.

1,173,262.

Specification of Letters Patent. Patented Feb. 29, 1916.

Application filed September 18, 1915. Serial No. 51,370.

*To all whom it may concern:*

Be it known that I, ROBERT GUNZBURG, a subject of the King of Great Britain, residing at 51 Albert Court, Kensington, in the county of Middlesex, England, have invented certain new and useful Improvements in Apparatus for Use in Practising the Game of Golf, of which the following is a specification.

My invention relates to an apparatus which can be used in practice with a driver, brassie or other golf club in confined spaces and by means of which the length or character of stroke with the club may be ascertained.

My invention comprises a race which may be of annular or spiral form, a funnel attached thereto into which the golf ball is projected by the club, the funnel being so located as to guide the ball smoothly into the race and means located in the race for indicating the distance which the ball would have traveled under normal conditions.

In the accompanying drawings illustrating my invention, Figure 1 is a side elevation, Fig. 2 a plan of the apparatus, Fig. 3 an enlarged sectional view on the line X—X in Fig. 1, Figs. 4 and 5 are respectively front elevation and plan of the distance registering device.

In the said figures, $a$ is an annular race which may be made of metal. This race is adapted to stand vertically on suitable supports $b$. The shape of the race is clearly shown in Fig. 3: its open side may be provided with a covering of netting or canvas to prevent the ball from falling out of the race. Tangential to the lower end of the race is fixed a funnel $c$ which is shown as being tapered throughout its length from the entrance $d$ to the exit $e$. This structure may be of netting or canvas or may have a framework of wire or netting covered with some stout textile material such as canvas. Near the inner end or exit as I have termed it, the walls of this structure are formed of some more rigid material such as sheet steel or vulcanized fiber and are so shaped that they guide the ball in a slightly spiral direction into the annular race $a$.

The ball is teed at the inlet of the apparatus and when it is struck by a club it passes through the funnel $c$ into the annular race $a$. The distance which it travels along the race or the number of times it travels around the race is a measure of the length of the stroke. In the annular race $a$ a simple, mechanical, measuring or indicating device adapted to be operated by the ball may be fixed for the purpose of indicating the distance the ball is traveling, that is, the distance the ball would have carried under normal conditions. This device may consist of a fly $f$ mounted on a horizontal shaft $g$ the arms of the fly being adapted to project into the path of the ball so that the shaft $g$ is rotated thereby. The shaft $g$ carries a friction disk $h$ with which engages a pinion $i$ on the axis of an indicating pointer $k$. The dial around which the pointer moves may be graduated in any suitable manner to indicate the distance traveled by the ball.

While the present invention is particularly useful in the practice of the game of golf, it is not necessarily limited thereto, but may be applied to any game in which similar problems arise.

What I claim as new and desire to secure by Letters Patent of the United States, is:—

1. Apparatus for use in practising the game of golf comprising a race and a funnel adapted to guide a ball into the race.

2. Apparatus for use in practising the game of golf comprising a race, a funnel adapted to guide a ball into a race, and means for indicating the travel of the ball.

3. Apparatus for use in practising the game of golf comprising a race, a funnel adapted to guide a ball into the race and means actuated by the ball for indicating the travel thereof.

4. Apparatus for use in practising the game of golf comprising a race and means adapted to guide a ball into the race.

5. Apparatus for use in practising the game of golf comprising a race, means adapted to guide a ball into the race, and means for indicating the travel of the ball.

6. Apparatus for use in practising the game of golf comprising a race, means adapted to guide a ball into the race and means actuated by the ball for indicating the travel thereof.

7. Apparatus for use in practising the game of golf comprising a race through which the ball is adapted to repeatedly pass and registering means actuated by the ball.

8. Apparatus for use in practising the game of golf comprising a race through which a ball is adapted to repeatedly pass and a fly located in the path of the ball for actuating a register.

9. Apparatus for use in practising the game of golf comprising an annular race through which a ball is adapted to repeatedly pass and registering means actuated by the ball.

10. Apparatus for use in practising the game of golf comprising a curved race through which a ball is adapted to pass, means for supporting the race in a vertical plane and guiding means adapted to lead the ball into the race.

11. An apparatus for practising the game of golf having a curved raceway through which a ball is adapted to pass, an entrance funnel leading into said raceway and supports for supporting the apparatus in an operative position.

In witness whereof, I have hereunto set my hand this third day of September, 1915.

R. GUNZBURG.